(12) United States Patent
Terunuma

(10) Patent No.: US 7,046,487 B2
(45) Date of Patent: May 16, 2006

(54) MAGNETORESISTIVE EFFECTIVE ELEMENT, THIN FILM MAGNETIC HEAD, MAGNETIC HEAD DEVICE AND MAGNETIC RECORDING/REPRODUCING DEVICE

(75) Inventor: Koichi Terunuma, Chuo-ku (JP)

(73) Assignee: TDK Corporation, Tokyo (JP)

( * ) Notice: Subject to any disclaimer, the term of this patent is extended or adjusted under 35 U.S.C. 154(b) by 229 days.

(21) Appl. No.: 10/667,349

(22) Filed: Sep. 23, 2003

(65) Prior Publication Data

US 2004/0066586 A1 Apr. 8, 2004

(30) Foreign Application Priority Data

Oct. 2, 2002 (JP) .................... 2002-289952

(51) Int. Cl.
*G11B 5/127* (2006.01)

(52) U.S. Cl. ...................................... 360/319
(58) Field of Classification Search ............... 360/319, 360/317, 313, 126, 121, 122, 324.1, 324.11, 360/324.12, 327.31
See application file for complete search history.

(56) References Cited

U.S. PATENT DOCUMENTS

| | | | | |
|---|---|---|---|---|
| 5,761,010 A | * | 6/1998 | Mimura | .............. 360/327.32 |
| 6,047,462 A | * | 4/2000 | Miyauchi et al. | ......... 29/603.14 |
| 6,469,879 B1 | | 10/2002 | Redon et al. | |
| 6,477,018 B1 | * | 11/2002 | Terunuma | .................... 360/317 |
| 6,545,848 B1 | * | 4/2003 | Terunuma | .............. 360/324.12 |
| 6,697,235 B1 | * | 2/2004 | Ohtsu et al. | ........... 360/324.12 |
| 6,717,778 B1 | * | 4/2004 | Arasawa et al. | ........ 360/324.12 |
| 2002/0075609 A1 | * | 6/2002 | Terunuma | .................... 360/319 |
| 2003/0021070 A1 | * | 1/2003 | Ohtsu et al. | ................. 360/317 |
| 2003/0053265 A1 | * | 3/2003 | Terunuma et al. | .......... 360/322 |
| 2003/0099069 A1 | * | 5/2003 | Kagami et al. | ............. 360/313 |
| 2003/0227725 A1 | * | 12/2003 | Macken et al. | ........ 360/324.12 |
| 2004/0066578 A1 | * | 4/2004 | Yamanaka | .................. 360/126 |
| 2004/0158973 A1 | * | 8/2004 | Arasawa et al. | ......... 29/603.15 |

FOREIGN PATENT DOCUMENTS

| JP | 10-312513 A | 11/1998 |
|---|---|---|
| JP | A 2000-262519 | 9/2000 |
| JP | 2001-229515 A | 8/2001 |
| JP | A 2002-74626 | 3/2002 |
| JP | A 2002-117510 | 4/2002 |

* cited by examiner

*Primary Examiner*—Allen Cao
(74) *Attorney, Agent, or Firm*—Oliff & Berridge, PLC (57) ABSTRACT

A first magnetic shielding film is disposed on one surface of a magnetoresistive effective film in a thickness direction thereof, and a second magnetic shielding film is disposed on the other surface of the magnetoresistive effective film in said thickness direction thereof. The antiferromagnetic films are disposed in between the first magnetic shielding film and the second magnetic shielding film, adjacent to and bonded through exchange interaction with at least one of the first magnetic shielding film and the second magnetic shielding film.

29 Claims, 7 Drawing Sheets

MAGNETORESISTIVE EFFECTIVE ELEMENT, THIN FILM MAGNETIC HEAD, MAGNETIC HEAD DEVICE AND MAGNETIC RECORDING/REPRODUCING DEVICE

BACKGROUND OF THE INVENTION

1. Field of the Invention

This invention relates to a magnetoresistive effective element, a thin film magnetic head, a magnetic head device and a magnetic recording/reproducing device.

2. Related Art Statement

With the rapid advance in high density recording for hard disks (HDDs), performances of thin film magnetic heads have been enhanced on vast researches and developments and then, follow the high density recording performances of the HDDs. As the thin film magnetic head is usually employed a composite type thin film magnetic head comprised of a reading element made of a magnetoresistive effective element (hereinafter, called as a "MR element") and a writing element made of an inductive type electromagnetic conversion element.

The MR element is mainly composed of a giant magnetoresistive effective film (hereinafter, called as a "GMR film") such as a spin valve film (hereinafter, called as a "SV film") and a ferromagnetic tunnel junction film (hereinafter, called as a "TMR film"). As the MR element with the SV film can be exemplified a CPP-GMR (Current Perpendicular to a Plane of a Giant Magnetoresistance) where a sense current is flowed perpendicular to the plane of the SV film, in addition to a typical GMR where a sense current is flowed parallel to the plane of the SV film.

Such a GMR film includes a pinned layer of which the direction of magnetization is pinned, a non-magnetic layer, and a magnetic response layer (hereinafter, called as a "free layer") of which the direction of magnetization responds to an external magnetic field. When the magnetization of the free layer is rotated by the external magnetic field, the resistance for sense current through the non-magnetic layer is varied on the relative angle between the pinned magnetization of the pinned layer and the rotatable magnetization of the free layer.

The GMR element requires a magnetic shielding structure so as not to be affected by the disturbance in the external magnetic field because the GMR element has huge rate of MR change. In this point of view, it is proposed to sandwich the MR film with a first and a second magnetic shielding films. The distance between the shielding films is generally called as a "shield gap".

Conventionally, the first and the second magnetic shielding films are generally formed with separated from the GMR film, but with the advance of high density recording, it is required to still narrow the shield gap. In this point of view, recently, it is mainly proposed that a pair of electrode films for flowing a sense current in the GMR element are made of conductive ferromagnetic material, and thus, also serves as the first magnetic shielding film and the second magnetic shielding film (cf., Patent Publication No. 3).

In the use of both the electrode films and the magnetic shielding films, the magnetizations of the magnetic shielding films may be changed due to the recording magnetic field, the magnetic field generated from the sense current in the GMR film and the like except the reading magnetic field generated from a magnetic recording medium, and thus, the GMR film may be affected by the change in magnetization of the magnetic shielding films. As a result, the reproducing output of the GMR element may become unstable and asymmetry fluctuation may be spawn. In a conventional thin film magnetic head with the above-mentioned GMR element, therefore, the fluctuation ratio of the reproducing output can be reduced only to 5.0%.

Patent Publication No. 1:
  Japanese Patent Application Laid-open No. 2000-262519 (FIGS. 1–6)
Patent Publication No. 2:
  Japanese Patent Application Laid-open No. 2001-6127 (FIG. 1)
Patent Publication No. 3:
  Japanese Patent Application Laid-open No. 2002-117510 (FIGS. 4 and 5)

SUMMARY OF THE INVENTION

It is an object of the present invention to provide a MR element, a thin film magnetic head, a magnetic head device and a magnetic recording/reproducing device which are unlikely to suffer from the change in magnetization of a magnetic shielding film.

For achieving the above object, a magnetoresistive effective element according to the present invention includes a magnetoresistive effective film (MR film), magnetic domain-controlling films, a first magnetic shielding film, a second magnetic shielding film and antiferromagnetic films. The magnetic domain-controlling films are disposed at both sides of the magnetoresistive effective film in a width direction thereof, respectively, and imparts control function of magnetic domain to the magnetoresistive effective film.

The first magnetic shielding film is disposed on one surface of the magnetoresistive effective film in a thickness direction thereof, and the second magnetic shielding film is disposed on the other surface of the magnetoresistive effective film in the thickness direction thereof.

The antiferromagnetic films are disposed in between the first magnetic shielding film and the second magnetic shielding film, adjacent to and bonded through exchange interaction with at least one of the first magnetic shielding film and the second magnetic shielding film.

As mentioned above, the MR element includes the MR film, which is preferably made of a GMR film. A SV film and a TMR film are exemplified as the GMR film. The GMR film includes a free layer, so Barkhausen noise in the free layer must be suppressed. Since the MR element includes the magnetic domain-controlling films which are disposed at both sides of the GMR film in the width direction, respectively, the magnetic domain of the free layer can be controlled by the magnetic domain-controlling films. As a result, the Barkhausen noise can be suppressed.

The MR element includes the first magnetic shielding film and the second magnetic shielding film which are formed on the GMR film in the thickness direction. In this case, since the GMR film is disposed in the shield gap between the first magnetic shielding film and the second magnetic shielding film, the GMR film can be shield against the disturbance in external magnetic field. In this case, reading magnetic field from a magnetic recording medium can be detected by the GMR film disposed in the shield gap at high sensitivity.

The MR element includes the antiferromagnetic films to satisfy the characteristic structural requirement. The antiferromagnetic films are formed in between the first magnetic shielding film and the second magnetic shielding film, adjacent to and bonded through exchange interaction with at least one of the shielding magnetic films. Therefore, the magnetization of the shielding film bonded with the antiferromagnetic film through exchange interaction can be stabilized, to render the reproducing output stable and suppress the asymmetry fluctuation which suffer from the change in magnetization of the shielding film. The change in magnetization of the shielding film is originated from the magnetic field generated from a magnetic recording medium, the recording magnetic field, the magnetic field generated from sense current in the GMR film, and the like. According to the present invention, therefore, the MR element can not be affected by the disturbance due to these magnetic fields.

The MR element also includes a first electrode film and a second electrode film for supplying a sense current thereto. The first electrode film is disposed on one surface of the GMR film in the thickness direction, and the second electrode film is disposed on the other surface of the GMR film in the thickness direction. Therefore, the GMR film is formed as a TMR film or a CPP-type SV film.

In the case of making the GMR film of the CPP-type SV film or the TMR film, it is desired that the first electrode film also serves as the first magnetic shielding film, and the second electrode film also serves as the second magnetic shielding film. Therefore, the resultant shield gap in the MR element can be minimized to be able to be applied for realize high density recording.

In the use of both the electrode films and the shielding films, the antiferromagnetic films are adjacent to and bonded through exchange interaction with both or either of the first magnetic shielding film and the second magnetic shielding film. In this case, the antiferromagnetic films are disposed at both sides of the GMR film in the width direction, respectively. The antiferromagnetic films may be made of electrically insulating material. The antiferromagnetic films may be also made of conductive material. The space formed by the magnetic domain-controlling films, the first magnetic shielding film and the second magnetic shielding film may be embedded by the antiferromagnetic films, which results in bonded through exchange interaction with the magnetic domain-controlling films.

Irrespective of the sort of the material of the antiferromagnetic films, electrical insulating layers may be formed in between the antiferromagnetic films and the magnetic domain-controlling films.

This invention also relates to a thin film magnetic head comprised of the above-mentioned magnetoresistive effective element as a reading element, a magnetic head device comprised of the above-mentioned thin film magnetic head and a head supporting device. Moreover, this invention relates to a magnetic recording/reproducing device comprised of the magnetic head device and the magnetic recording medium. In these thin film devices, the same function as the MR element can be exhibited.

BRIEF DESCRIPTION OF THE DRAWINGS

For a better understanding of this invention, reference is made to the attached drawings, wherein.

DETAILED DESCRIPTION OF PREFERRED EMBODIMENTS

1. MR element

Figure 1:
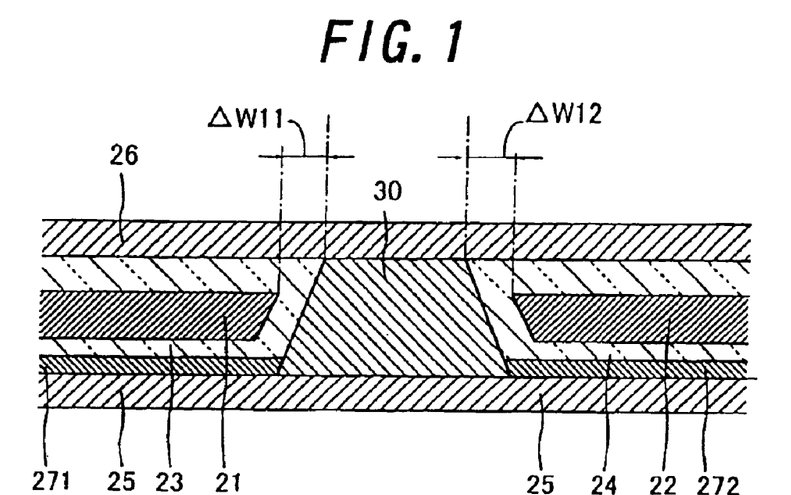
FIG. 1 is a cross sectional view showing a MR element according to the present invention.

FIG. 1 is a cross sectional view showing a MR element according to the present invention. The illustrated MR element includes a GMR film 30, magnetic domain-controlling films 21 and 22, a first magnetic shielding film 25, a second magnetic shielding film 26, and antiferromagnetic films 271 and 272. The GMR film 30 includes a free layer (not shown) to respond to external magnetic field, and the magnetic domain-controlling films 21 and 22 are disposed at both sides of the GMR film 30 in the width direction, respectively, to control the magnetic domain of the free layer of the GMR film 30.

In this embodiment, the magnetic domain-controlling films 21 and 22 are made of hard magnetic film (magnet) such as CoCrPt and CoPt. The films 21 and 22 may be made of antiferromagnetic film. The thickness of the films 21 and 22 is preferably set within 15–60 nm.

The first magnetic shielding film 25 is disposed on one surface of the GMR element 30 in the thickness direction, and the second magnetic shielding film 26 is disposed on the other surface of the GMR element 30 in the thickness direction.

The MR element also includes a first electrode film 25 and a second electrode film 26 for supplying a sense current thereto. The first electrode film 25 is disposed on one surface of the GMR film 30 in the thickness direction, and the second electrode film 26 is disposed on the other surface of the GMR film 30 in the thickness direction. In this embodiment, therefore, the GMR film 30 is formed as a TMR film or a CPP-type SV film.

As is apparent from the above description, in this embodiment, the first electrode film 25 also serves as the first magnetic shielding film 25, and the second electrode film 26 also serves as the second magnetic shielding film 26. Therefore, the resultant shield gap in the MR element can be minimized to be able to be applied for realize high density recording. In the use of both the electrode films and the shielding films, the films 25 and 26 may be made of CoFe, NiFe, CoNiFe and the like. The thickness of the films 25 and 26 may be set within 5–30 nm.

The antiferromagnetic films 271 and 272 are formed on the first shielding film 25 at both sides of the GMR film 30 in the width direction to be bonded through exchange interaction with the film 25.

The antiferromagnetic films 271 and 272 may be made of electrically insulating material such as NiO, CoO, $Fe_2O_3$, and mixture thereof. The thickness of the antiferromagnetic films 271 and 272 may be set within 10–50 nm.

The antiferromagnetic films 271 and 272 may be also made of conductive material such as FeMn, PtMn, IrMn, NiMn, CrPtMn, and mixture thereof.

The magnetic domain-controlling films 21 and 22 may be embedded in insulating film 23 and 24, as illustrated in FIG. 1, irrespective of the sort of the material of the antiferromagnetic films 271 and 272. The insulating layers 23 and 24 may be made of metallic oxide such as $Al_2O_3$ and $SiO_2$. The thickness of the insulating layers 23 and 24 may be set within 5–50 nm.

As mentioned above, the MR element includes the GMR film 30 with the free layer, so Barkhausen noise in the free layer must be suppressed. Since the MR element includes the magnetic domain-controlling films 21 and 22 which are disposed at both sides of the GMR film 30 in the width direction, the magnetic domain of the free layer can be controlled by the magnetic domain-controlling films 21 and 22. As a result, the Barkhausen noise can be suppressed.

The MR element includes the first magnetic shielding film 25 and the second magnetic shielding film 26 which are disposed on the GMR film 30 in the thickness direction. As a result, since the GMR film 30 is located in the shield gap formed by the first magnetic shielding film 25 and the second magnetic shielding film 26, the GMR film 30 can be shielded against the disturbance in external magnetic field. In this case, reading magnetic field from a magnetic recording medium can be detected by the GMR film 30 located in the shield gap at high sensitivity.

The MR element includes the antiferromagnetic films 271 and 272 to satisfy the characteristic structural requirement. The antiferromagnetic films 271 and 272 are formed on the first magnetic shielding film 25, respectively, to be bonded with the film 25 through exchange interaction. Therefore, the magnetization of the first magnetic shielding film 25, bonded through exchange interaction with the antiferromagnetic films 271 and 272, can be stabilized, to render the reproducing output stable and suppress the asymmetry fluctuation which suffer from the change in magnetization of the first magnetic shielding film 25. In this embodiment, the fluctuation ratio of the reproducing output can be reduced to 1.1%.

The change in magnetization of the first magnetic shielding film 25 is originated from the magnetic field generated from the magnetic recording medium, the recording magnetic field, the magnetic field generated from sense current in the GMR film 30, and the like. According to the present invention, therefore, the MR element can not be affected by the disturbance due to these magnetic fields.

In this embodiment, the magnetic domain-controlling films 21 and 22 are disposed at both sides of the GMR film 30 by distances ΔW11 and ΔW12, respectively. The space formed by the magnetic domain-controlling films 21 and 22, the second electrode film 26, the antiferromagnetic films 271 and 272, and the GMR film 30 is embedded with the insulating layers 23 and 24. Concretely, the insulating layers 23 and 24 are layered in the spaces between the magnetic domain-controlling films 21; 22 and the second electrode film 26 and between the magnetic domain-controlling films 21; 22 and the antiferromagnetic films 271 and 272. Then, the insulating layers 23 and 24 are formed so as to embed the gaps ΔW11 and ΔW12 in between the magnetic domain-controlling films 21; 22 and the GMR film 30.

In this embodiment, the first electrode film 25 and the second electrode film 26 are formed on the GMR film 30, respectively, so that a sense current can be flowed perpendicular to the plane of the GMR film 30. Therefore, the GMR film 30 is made of a CPP-type SV film or a TMR film as mentioned above.

The insulating layers 23 and 24 are located in between the magnetic domain-controlling films 21; 22 and the electrode films 25; 26, respectively, and embed the gaps ΔW11 and ΔW12 in between the magnetic domain-controlling films 21; 22 and the GMR film 30. Therefore, with the insulating layers 23 and 24, the sense current can not be leaked to the magnetic domain-controlling films 21 and 22 from the electrode films 25; 26 and the GMR film 30.

Figure 2:
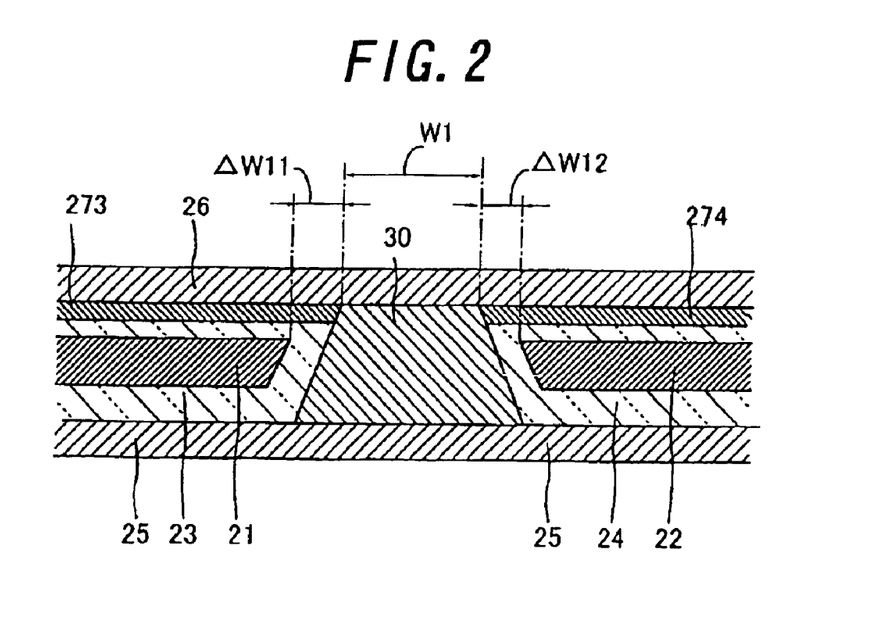
FIG. 2 is a cross sectional view showing another MR element according to the present invention.

FIG. 2 is a cross sectional view showing another MR element according to the present invention. In this figure, like reference numerals are given to like components to the ones illustrated in FIG. 1 relating to the above-mentioned embodiment. In this embodiment, the antiferromagnetic films 273 and 274 are formed on the second shielding film 26 to be bonded with the film 26 through exchange interaction. Therefore, the magnetization of the second magnetic shielding film 26, bonded through exchange interaction with the antiferromagnetic films 273 and 274, can be stabilized, to render the reproducing output stable and suppress the asymmetry fluctuation which suffer from the change in magnetization of the second magnetic shielding film 26. In this embodiment, the fluctuation ratio of the reproducing output can be reduced to 1.0%.

Figure 3:
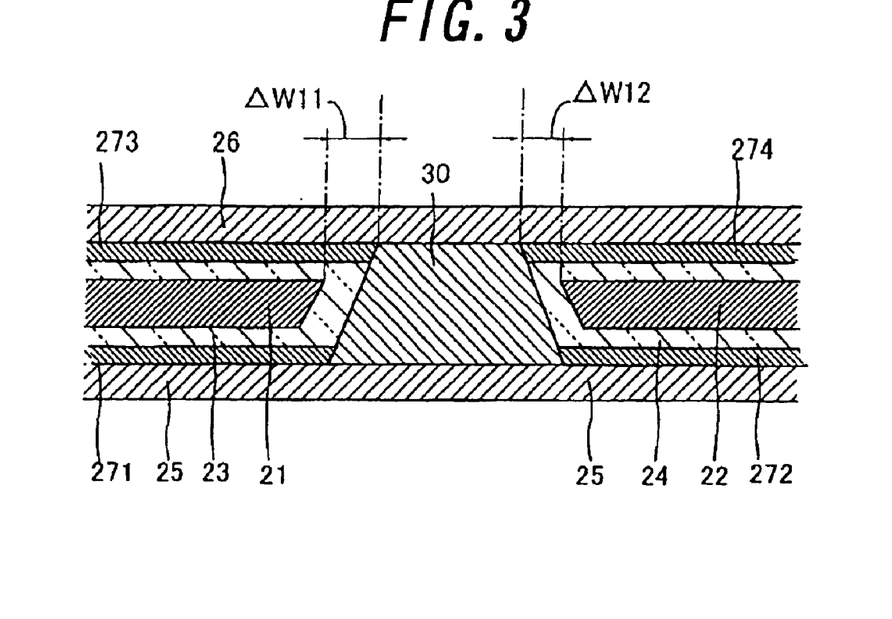
FIG. 3 is a cross sectional view showing still another MR element according to the present invention.

FIG. 3 is a cross sectional view showing still another MR element according to the present invention. In this figure, like reference numerals are given to like components to the ones illustrated in FIG. 1 relating to the above-mentioned embodiment. In this embodiment, the antiferromagnetic films 271 and 272 are formed on the first magnetic shielding film 25 to be bonded with film 25 through exchange interaction, and the antiferromagnetic films 273 and 274 are formed on the second magnetic shielding film 26 to be bonded with the film 26 through exchange interaction. Therefore, the magnetizations of the first magnetic shielding film 25 and the second magnetic shielding film 26, bonded through exchange interaction with the antiferromagnetic films 271; 272 and 273; 274, respectively, can be stabilized, to render the reproducing output stable and suppress the asymmetry fluctuation which suffer from the change in magnetization of the first magnetic shielding film 25 and the second magnetic shielding film 26. In this embodiment, the fluctuation ratio of the reproducing output can be reduced to 0.3%.

Figure 4:
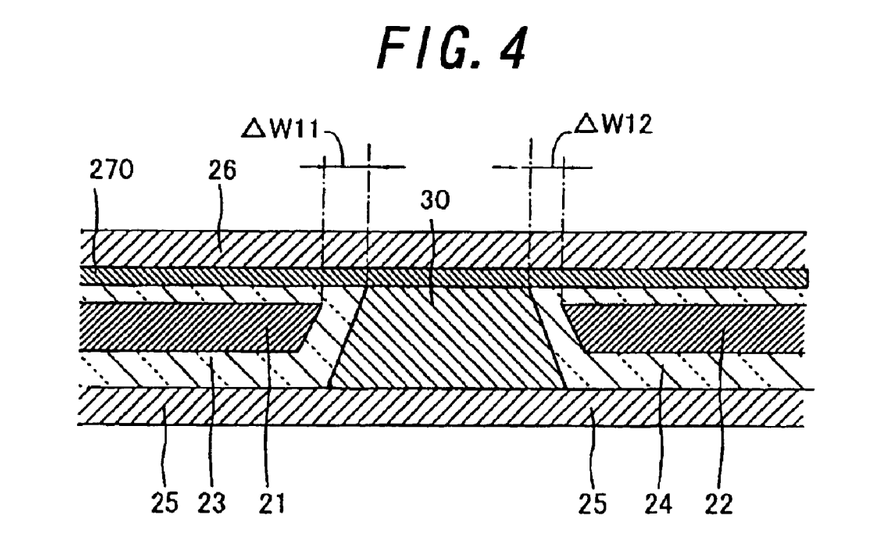
FIG. 4 is a cross sectional view showing a further MR element according to the present invention.

FIG. 4 is a cross sectional view showing a further MR element according to the present invention. In this figure, like reference numerals are given to like components to the ones illustrated in FIG. 1 relating to the above-mentioned embodiment. In this embodiment, an antiferromagnetic film 270 is formed on the second magnetic shielding film 26 to be bonded with the film 26 through exchange interaction. The antiferromagnetic film 270 is made of conductive material. Therefore, the magnetization of the second magnetic shielding film 26, bonded through exchange interaction with the antiferromagnetic film 270, can be stabilized, to render the reproducing output stable and suppress the asymmetry fluctuation which suffer from the change in magnetization of the second magnetic shielding film 26. The antiferromagnetic film 270 may be bonded with the ferromagnetic layer of the GMR film 30 through exchange interaction, so serving as an antiferromagnetic film for pinning the direction of magnetization in the ferromagnetic film.

Figure 5:
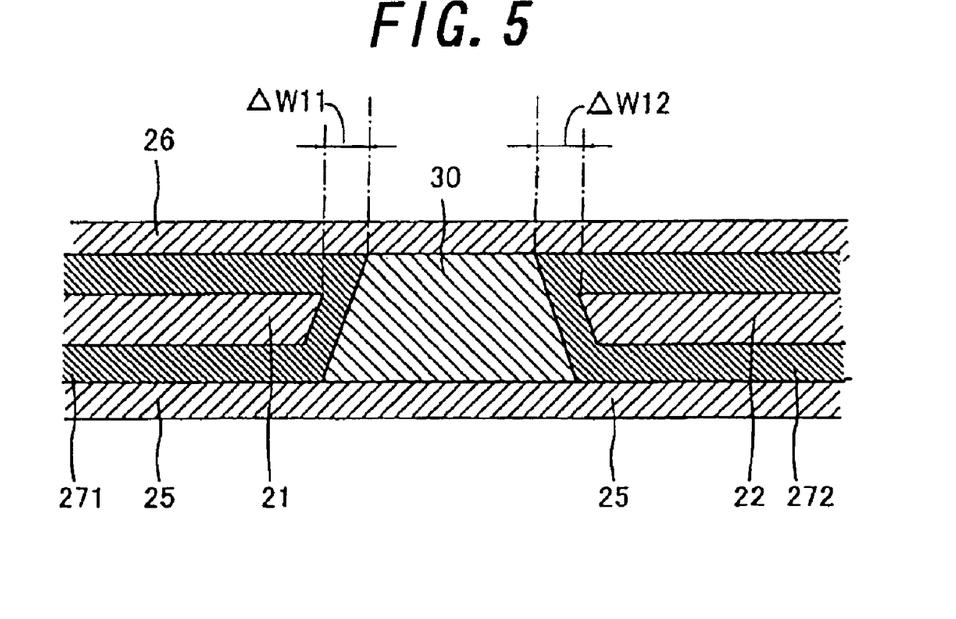
FIG. 5 is a cross sectional view showing a still further MR element according to the present invention.

FIG. 5 is a cross sectional view showing a still further MR element according to the present invention. In this figure, like reference numerals are given to like components to the ones illustrated in FIG. 1 relating to the above-mentioned embodiment. In this embodiment, the antiferromagnetic films 271 and 272 are formed so as to embed the space formed by the magnetic domain-controlling films 21; 22, the first magnetic shielding film 25, the second magnetic shielding film 26 and the GMR film 30 to be bonded with the films 21 and 22 through exchange interaction. Also, the antiferromagnetic film 271 and 272 are bonded with the first magnetic shielding film 25 and the second magnetic shielding film 26 through exchange interaction.

In this embodiment, the antiferromagnetic films 271 and 272 can control the magnetic domain of the GMR film 30 with the magnetic field generated from the bond with the magnetic domain-controlling films 21 and 22 through exchange interaction. The antiferromagnetic films 271 and 272 are made of electrically insulating material such as NiO. If the antiferromagnetic films 271 and 272 are made of NiO, in order to realize the bond with exchange interaction, the magnetic domain-controlling films 21 and 22 are made of CoFe. In this embodiment, the fluctuation ratio of the reproducing output can be reduced to 0.3%.

As mentioned above, according to the present invention, the fluctuation ratio of the reproducing output in the MR element can be reduced within 0.3–1.1%. In view of large fluctuation ratio of reproducing output in a conventional MR element, in the present invention, it is turned out that the fluctuation ratio of the reproducing output is very small.

2. Thin Film Magnetic Head

Figure 6:
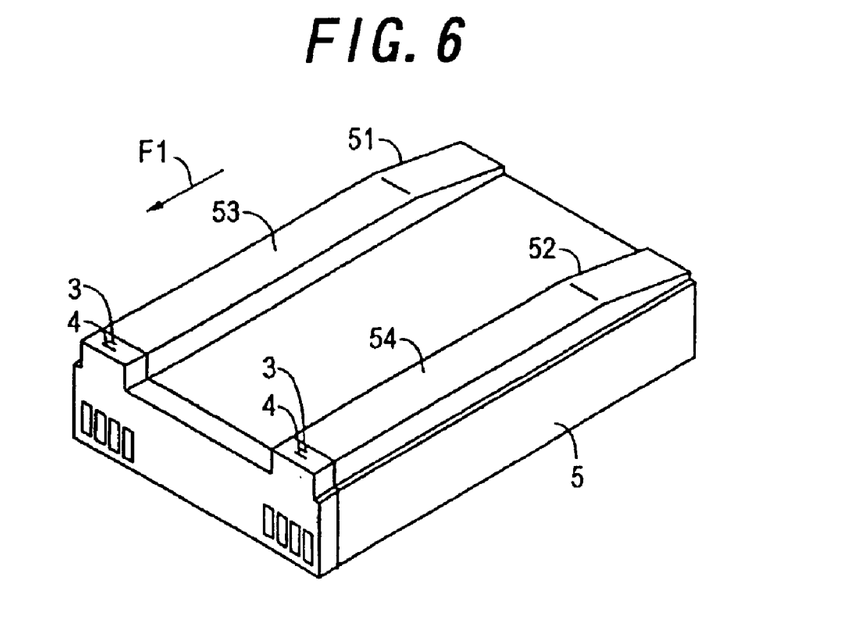
FIG. 6 is a perspective view showing a thin film magnetic head according to the present invention.
Figure 7:
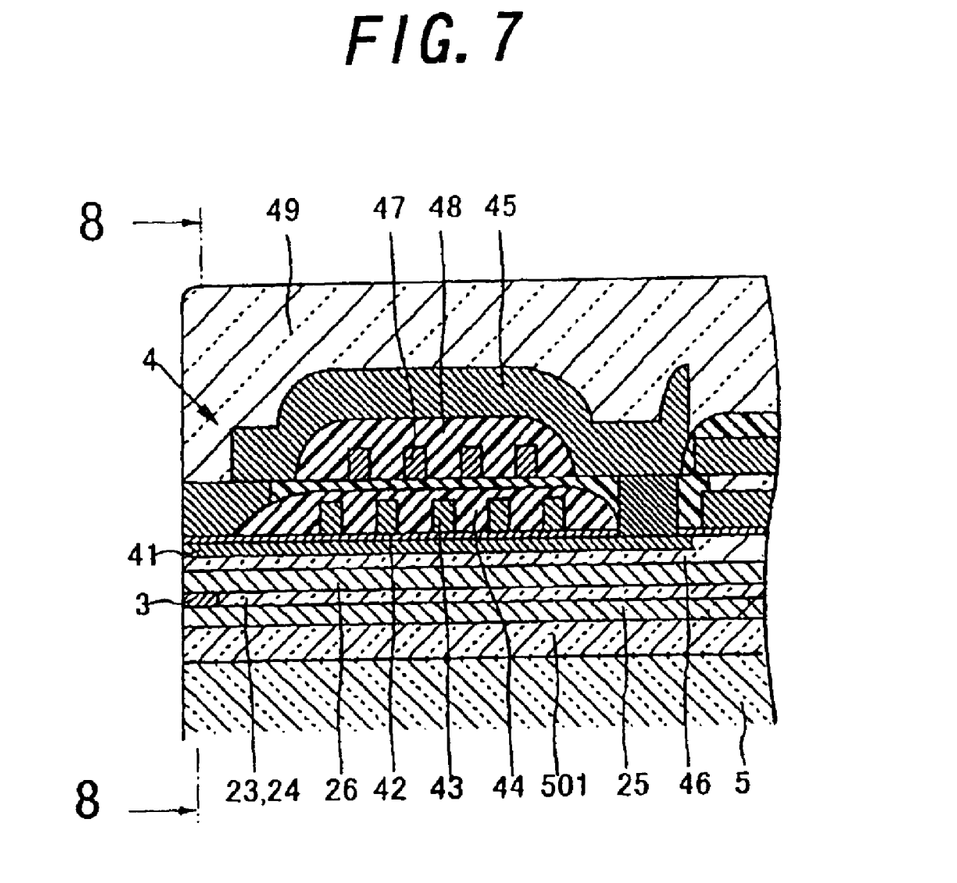
FIG. 7 is an enlarged cross sectional view showing the portion encompassing the electromagnetic conversion element of the thin film magnetic head in FIG. 6.
Figure 8:
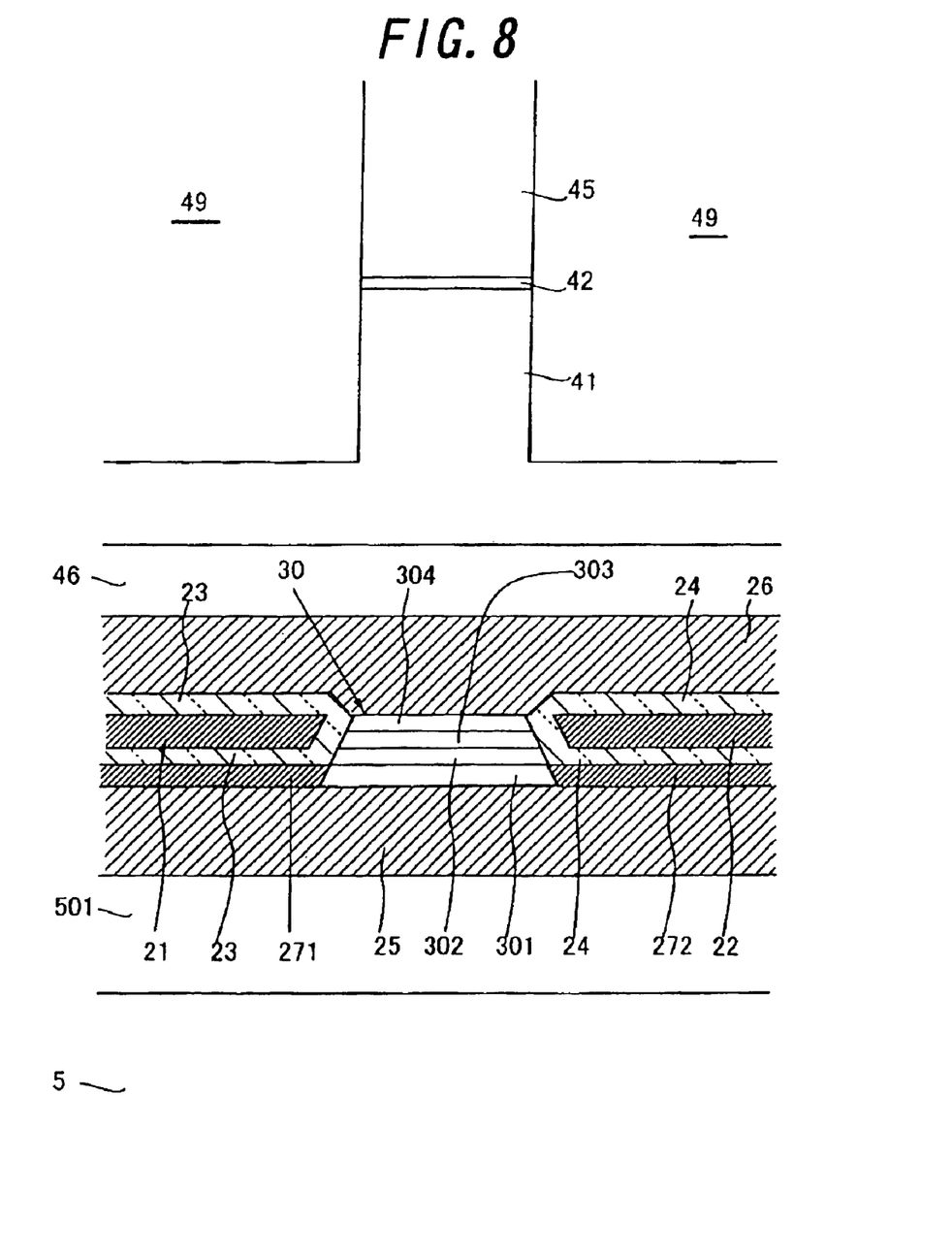
FIG. 8 is a cross sectional view of the thin film magnetic head in FIG. 7, taken on line "8—8"

FIG. 6 is a perspective view showing a thin film magnetic head according to the present invention, and FIG. 7 is an enlarged cross sectional view showing the portion encompassing the electromagnetic conversion element of the thin film magnetic head in FIG. 6, and FIG. 8 is a cross sectional view of the thin film magnetic head in FIG. 7, taken on line "8—8". In this embodiment, the thin film magnetic head illustrated in FIGS. 6–8 includes the MR element illustrated in FIG. 1 as a reading element, but may include another MR element as illustrated in FIGS. 2–5. In FIGS. 6–8, some components are overdrawn or omitted for simplification.

The illustrated thin film magnetic includes a slider base 5, and electromagnetic conversion elements 3 and 4. The slider base 5 may have various geometrical shape for improving its floating characteristic. As the typical geometrical shape, in this embodiment, the slider base 5 has two rails 51 and 52. The surfaces of the rails 51 and 52 are employed as air bearing surfaces (hereinafter, called as "ABS"s) 53 and 54. The slider base 5 does not always have the two rails 51 and 52, but may have any geometrical shape such as linear shape, complicated shape and negative pressure-generating shape. This invention can be applied for any types of slider. The slider base 5 is made of ceramic material such as AlTiC ($Al_2O_3$—TiC).

Referring to FIGS. 6–8, on the side edge of the slider base 5 are formed an insulating layer 501 made of insulating material such as alumina ($Al_2O_3$) and $SiO_2$. The thickness of the insulating layer 501 is set within 1–5 nm.

The electromagnetic conversion elements 3 and 4 include a MR element 3 as a reproducing element and a recording element 4, respectively. The MR element 3 includes a SV film or a TMR film. As the SV film, concretely, a CPP-GMR is employed, which flows sense current perpendicular to the plane thereto. With the TMR film, sense current is flowed inherently perpendicular to the plane thereto.

The recording element 4 may be made of an inductive type magnetic conversion element of which the magnetic pole edges for writing are exposed to the ABSs 53 and 54. The recording element 4 is disposed in the vicinity of the MR element 3 as the reproducing element and covered with a protective film 49.

The recording element 4 includes a first magnetic layer 41, a second magnetic layer 45, a recording gap layer 43, and thin film coils 43 and 47. The first magnetic layer 41 also serves as a top shielding layer 41.

The first magnetic layer 41 is formed on an insulating layer 46, and magnetically connected with the second magnetic layer 45. The magnetic pole portions of the first magnetic layer 41 and the second magnetic layer 45 are separated by the recording gap layer 42. The thin film coils 43 and 47 are embedded in an insulating layer 48 formed in the inner gap between the first magnetic layer 41 and the second magnetic layer 45.

The MR element 3 includes the GMR film 30, the first electrode film 25, the second electrode film 26, the insulating films 23 and 24, and the antiferromagnetic films 271 and 272.

Referring to FIG. 8, the GMR film 30 includes a free layer 301, a non-magnetic layer 302, a pinned layer 303 and an antiferromagnetic layer 304 which are successively stacked. The magnetization of the pinned layer 303 is pinned by the bond with the antiferromagnetic film 304 through exchange interaction.

The free layer 301, the non-magnetic layer 302, the pinned layer 303 and the antiferromagnetic layer 304 may be formed of their respective well known materials in their respective well known layered structures. For example, the free layer 301 and the pinned layer 303 may be made of NiFe, NiFeCo, CoFe or the like, and the antiferromagnetic layer 304 may be made of FeMn, IrMn, NiMn, CrPtMn or the like.

The non-magnetic layer 302 is made of conductive material mainly containing Cu if the GMR film 30 is made of a CPP-type SV film. The non-magnetic layer 302 is made of insulating material such as aluminum oxide if the GMR film 30 is made of a TMR film.

The first electrode film 25 is formed on an insulating layer 501. One surface of the first electrode film 25 is adjacent to the free layer 301 of the GMR film 30. The first electrode film 25 also serves as a first magnetic shielding film 25.

One surface of the second electrode film 26 is adjacent to the antiferromagnetic layer 304 of the GMR film 30. The second electrode film 26 also serves as a second magnetic shielding film 26.

The antiferromagnetic films 271 and 272 are formed on the first magnetic shielding film 25, respectively, to be bonded with the film 25 through exchange interaction. The antiferromagnetic films 271 and 272 are also disposed at both sides of the GMR film 30 in the width direction, respectively. In this case, the magnetization of the first magnetic shielding film 25, bonded through exchange interaction with the antiferromagnetic films 271 and 272, can be stabilized, to render the reproducing output stable and suppress the asymmetry fluctuation which suffer from the change in magnetization of the first magnetic shielding film 25.

The magnetic domain-controlling films 21 and 22 are disposed at both sides of the GMR film 30 via the insulating layers 23 and 24, respectively. The magnetic domain-controlling films 21 and 22 control the magnetic domain of the free layer 301.

The space formed by the magnetic domain-controlling films 21 and 22, the second electrode film 26, the antiferromagnetic films 271 and 272, and the GMR film 30 is embedded with the insulating layers 23 and 24. Concretely, the insulating layers 23 and 24 are layered in the spaces between the magnetic domain-controlling films 21; 22 and the second electrode film 26 and between the magnetic domain-controlling films 21; 22 and the antiferromagnetic films 271 and 272. Then, the insulating layers 23 and 24 are formed so as to embed the gaps in between the magnetic domain-controlling films 21; 22 and the GMR film 30.

Since the GMR film 30, made of the CPP-type SV film or the TMR film, includes the free layer 301, Barkhausen noise in the free layer 301 must be suppressed. Since the MR element includes the magnetic domain-controlling films 21 and 22 which are disposed at both sides of the GMR film 30 in the width direction, the magnetic domain of the free layer 301 can be controlled by the magnetic domain-controlling films 21 and 22. As a result, the Barkhausen noise can be suppressed.

The insulating layers 23 and 24 are located in between the magnetic domain-controlling films 21; 22 and the electrode films 25; 26, respectively, and embed the gaps ΔW11 and ΔW12 in between the magnetic domain-controlling films 21; 22 and the GMR film 30. Therefore, with the insulating layers 23 and 24, the sense current can not be leaked to the magnetic domain-controlling films 21 and 22 from the electrode films 25; 26 and the GMR film 30.

3. Magnetic Head Device

Figure 9:
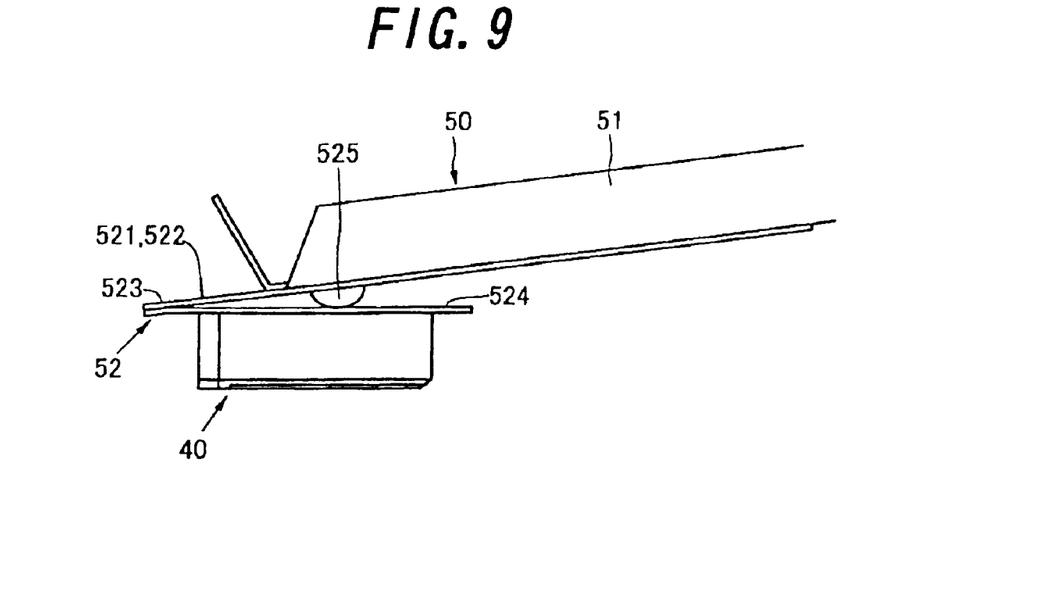
FIG. 9 is an elevational view showing a magnetic head device according to the present invention.
Figure 10:
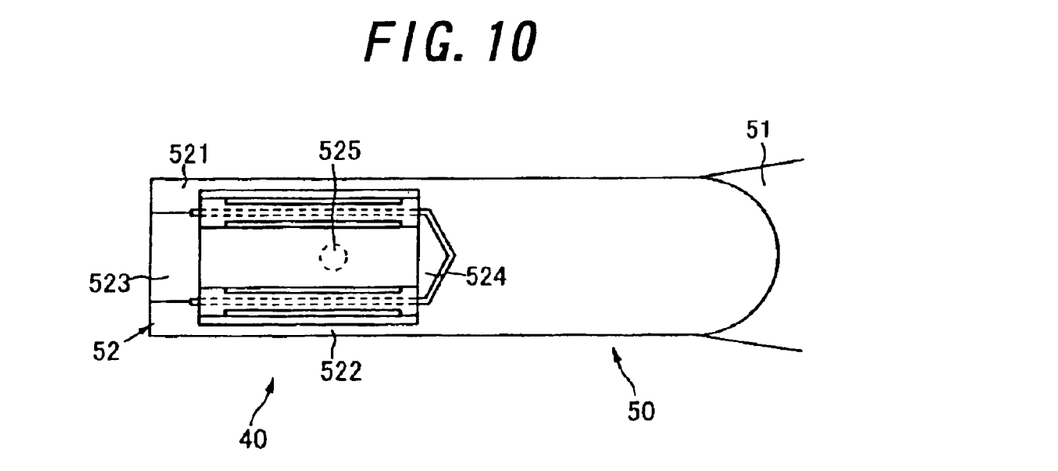
FIG. 10 is a bottom plan view of the magnetic head device in FIG. 9.

FIG. 9 is an elevational view showing a magnetic head device according to the present invention, and FIG. 10 is a bottom plan view of the magnetic head device in FIG. 9. The illustrated magnetic head device includes a thin film magnetic head 40 as shown in FIGS. 6–8, and a head supporting device 50. The head supporting device 50 is comprised of a supporter 51 made of a metallic plate and a flexibler 52 made of a metallic plate provided on the free edge of the supporter 51 in its longitudinal direction. The thin film magnetic head 40 is attached on the lower surface of the flexibler 52.

The flexibler 52 has two outerframes 521 and 522 substantially parallel to the supporter 51 in its longitudinal direction, a lateral frame 523 to join the outerframes 521 and 522 in the remote portion thereof from the supporter 51, and a tongue shaped member 524, of which the forefront is free, extending substantially parallel to the outerframes 521 and 522 from the almost central portion of the lateral frame 523. The other edge of the tongue shaped member 524 is attached to the free edge of the supporter 51 by means of welding or the like.

On the lower surface of the supporter 51 is provided a hemispheric loading convex portion 525, which conducts a load to the tongue shaped member 524 from the free edge of the supporter 51.

The thin film magnetic head 40 is attached to the lower surface of the tongue shaped member 524, and may be pitch-driven and roll-driven.

The present invention is not limited to the above-mentioned magnetic head device, but applicable for any kind of magnetic head device proposed previously or to be proposed in future. For example, the supporter 51 and the tongue shaped member 524 may be combined with a flexible polymer wiring plate such as TAB tape. Also, a magnetic head device of gimbal structure well known may be employed.

4. Magnetic Recording/Reproducing Device

Figure 11:
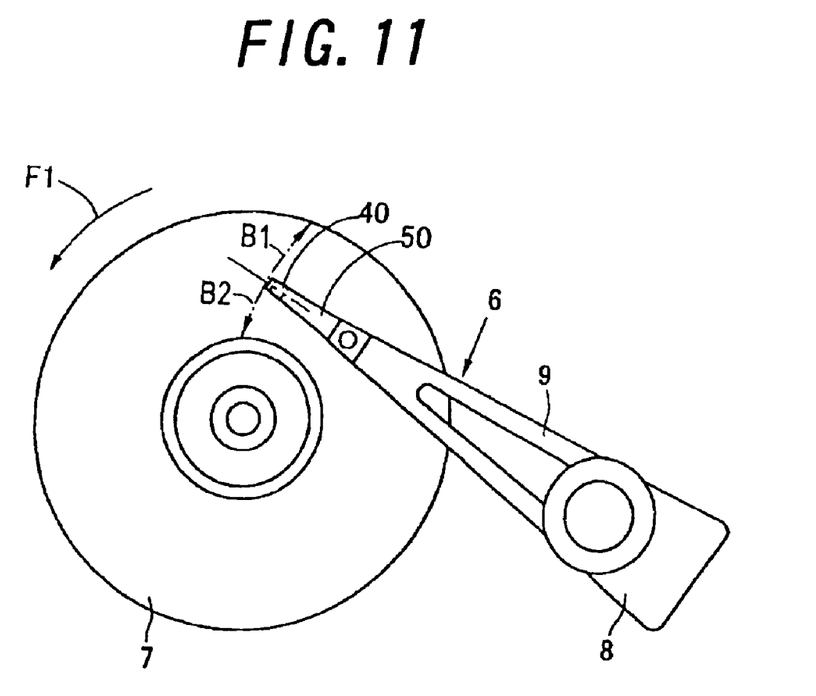
FIG. 11 is a plan view showing a magnetic recording/reproducing device according to the present invention.

FIG. 11 is a plan view showing a magnetic recording/reproducing device according to the present invention. The illustrated magnetic recording/reproducing device includes a magnetic head device 6 as illustrated in FIGS. 9 and 10, a position determining device 8 and a magnetic disk 7. The position determining device 8 is driven on the principle of rotary actuator system, and supports the other edge of the head supporting device 50.

In this embodiment, the magnetic disk 7 is rotated at high velocity in the direction designated by the arrow "F1" by means of not shown rotation driving mechanism with cooperated with the magnetic head device 6.

The thin film magnetic head 40 is driven in the direction designated by the arrow "B1" or "B2" by the head supporting device 50, an arm 9 and the position determining device 8, thereby to perform magnetic recording and reproducing for the magnetic disk 7.

Although the present invention was described in detail with reference to the above examples, this invention is not limited to the above disclosure and every kind of variation and modification may be made without departing from the scope of the present invention.

As mentioned above, according to the present invention can be provided a MR element, a thin film magnetic head, a magnetic head device and a magnetic recording/reproducing device which are unlikely to suffer from the change in magnetization of a magnetic shielding film.

What is claimed is:

1. A magnetoresistive effective element comprising a magnetoresistive effective film, magnetic domain-controlling films, a first magnetic shielding film, a second magnetic shielding film and antiferromagnetic films, said magnetic domain-controlling films being disposed at both sides of said magnetoresistive effective film in a width direction thereof, respectively, and imparting control function of magnetic domain to said magnetoresistive effective film, said first magnetic shielding film being disposed on one surface of said magnetoresistive effective film in a thickness direction thereof, said second magnetic shielding film being disposed on the other surface of said magnetoresistive effective film in said thickness direction thereof, said antiferromagnetic films being disposed in between said first magnetic shielding film and said second magnetic shielding film, adjacent to and bonded through exchange interaction with at least one of said first magnetic shielding film and said second magnetic shielding film.

2. The magnetoresistive effective element as defined in claim 1, further comprising a first electrode film and a second electrode film, said first electrode film being adjacent to one surface of said magnetoresistive effective film, said second electrode film being adjacent to the other surface of said magnetoresistive effective film.

3. The magnetoresistive effective element as defined in claim 2, wherein said first electrode film serving as said first magnetic shielding film, and said second electrode film serving as said second magnetic shielding film.

4. The magnetoresistive effective element as defined in claim 3, wherein said antiferromagnetic films are adjacent to and bonded through exchange interaction with said first magnetic shielding film.

5. The magnetoresistive effective element as defined in claim 3, wherein said antiferromagnetic films are adjacent to and bonded through exchange interaction with said second magnetic shielding film.

6. The magnetoresistive effective element as defined in claim 3, wherein said antiferromagnetic films are adjacent to and bonded through exchange interaction with said first magnetic shielding film and said second magnetic shielding film.

7. The magnetoresistive effective element as defined in claim 4, wherein said antiferromagnetic films are disposed at both sides of said magnetoresistive effective film in said width direction thereof, respectively.

8. The magnetoresistive effective element as defined in claim 4, wherein said antiferromagnetic films exhibit electrical insulation.

9. The magnetoresistive effective element as defined in claim 8, wherein said antiferromagnetic films are made of at least one selected from the group consisting of NiO, CoO and $Fe_2O_3$.

10. The magnetoresistive effective element as defined in claim 4, further comprising electrical insulating layers between said antiferromagnetic films and said magnetic domain-controlling films.

11. The magnetoresistive effective element as defined in claim 6, wherein said antiferromagnetic films embed a space formed by said magnetic domain-controlling film, said first magnetic shielding film and said second magnetic shielding film, and is bonded with said magnetic domain-controlling film through exchange interaction.

12. The magnetoresistive effective element as defined in claim 4, wherein said antiferromagnetic films exhibit electrical conduction.

13. The magnetoresistive effective element as defined in claim 12, wherein said antiferromagnetic films are made of at least one selected from the group consisting of FeMn, PtMn, IrMn, NiMn and CrPtMn.

14. The magnetoresistive effective element as defined in claim 12, further comprising electrical insulating layers between said antiferromagnetic films and said magnetic domain-controlling films.

15. The magnetoresistive effective element as defined in claim 1, wherein said magnetoresistive effective film is made of a spin valve film.

16. The magnetoresistive effective element as defined in claim 7, wherein said magnetoresistive effective film is made of a spin valve film.

17. The magnetoresistive effective element as defined in claim 11, wherein said magnetoresistive effective film is made of a spin valve film.

18. The magnetoresistive effective element as defined in claim 1, wherein said magnetoresistive effective film is made of a ferromagnetic tunnel junction film.

19. The magnetoresistive effective element as defined in claim 7, wherein said magnetoresistive effective film is made of a ferromagnetic tunnel junction film.

20. The magnetoresistive effective element as defined in claim 11, wherein said magnetoresistive effective film is made of a ferromagnetic tunnel junction film.

21. A thin film magnetic head comprising a magnetoresistive effective element as defined in claim 1 and a slider to support said magnetoresistive effective element.

22. A thin film magnetic head comprising a magnetoresistive effective element as defined in claim 7 and a slider to support said magnetoresistive effective element.

23. A thin film magnetic head comprising a magnetoresistive effective element as defined in claim 11 and a slider to support said magnetoresistive effective element.

24. A magnetic head device comprising a thin film magnetic head as defined in claim 21 and a head supporting device to support said thin film magnetic head.

25. A magnetic head device comprising a thin film magnetic head as defined in claim 22 and a head supporting device to support said thin film magnetic head.

26. A magnetic head device comprising a thin film magnetic head as defined in claim 23 and a head supporting device to support said thin film magnetic head.

27. A magnetic recording/reproducing device comprising a magnetic head device as defined in claim 24 and a magnetic recording medium to be magnetically written and read with cooperated with said magnetic head device.

28. A magnetic recording/reproducing device comprising a magnetic head device as defined in claim 25 and a magnetic recording medium to be magnetically written and read with cooperated with said magnetic head device.

29. A magnetic recording/reproducing device comprising a magnetic head device as defined in claim 26 and a magnetic recording medium to be magnetically written and read with cooperated with said magnetic head device.

* * * * *